(No Model.) 4 Sheets—Sheet 2.
W. KUHN.
PROCESS OF PASTEURIZATION OF BEER.
No. 418,872. Patented Jan. 7, 1890.
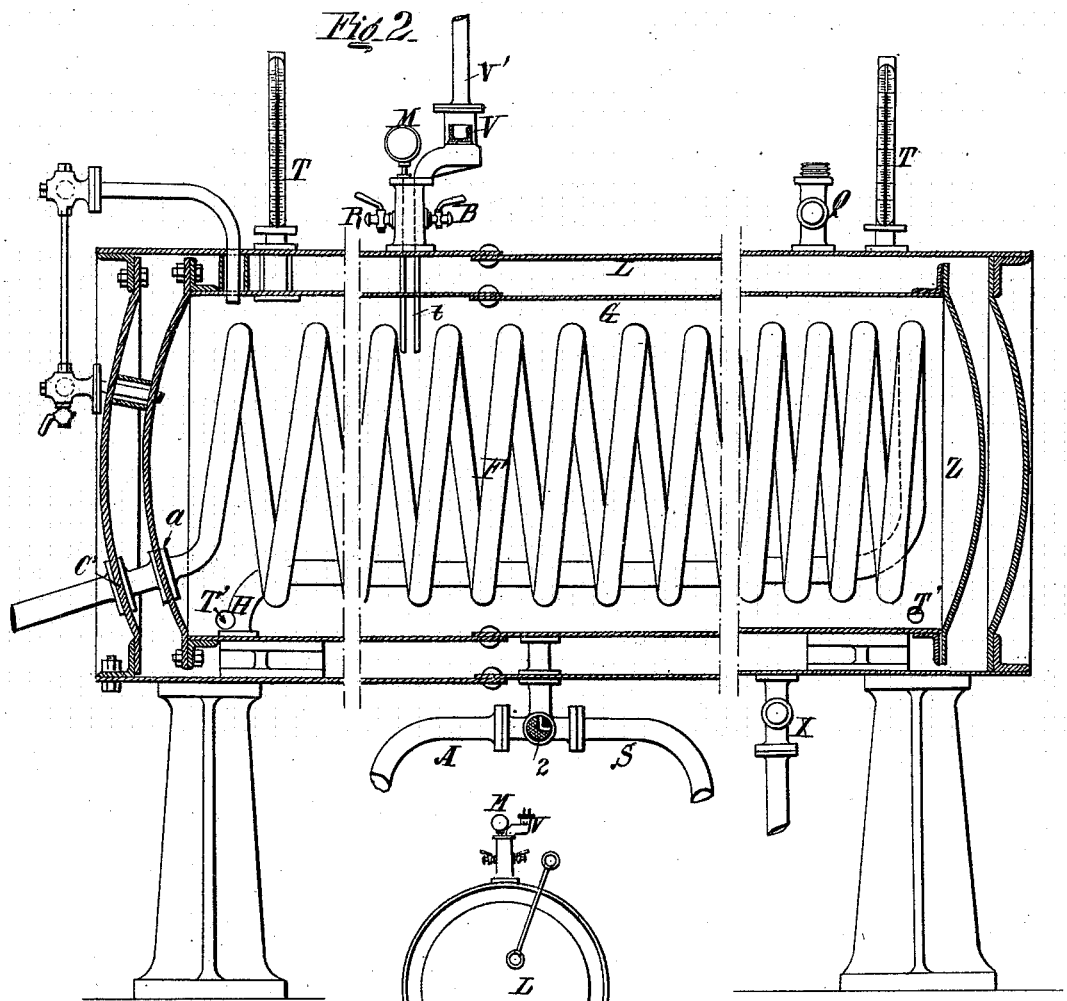
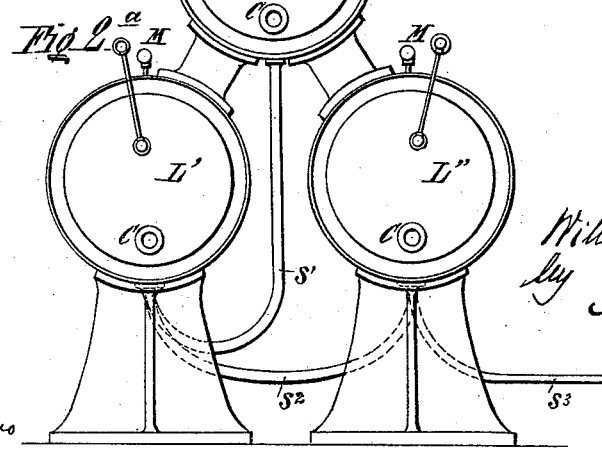

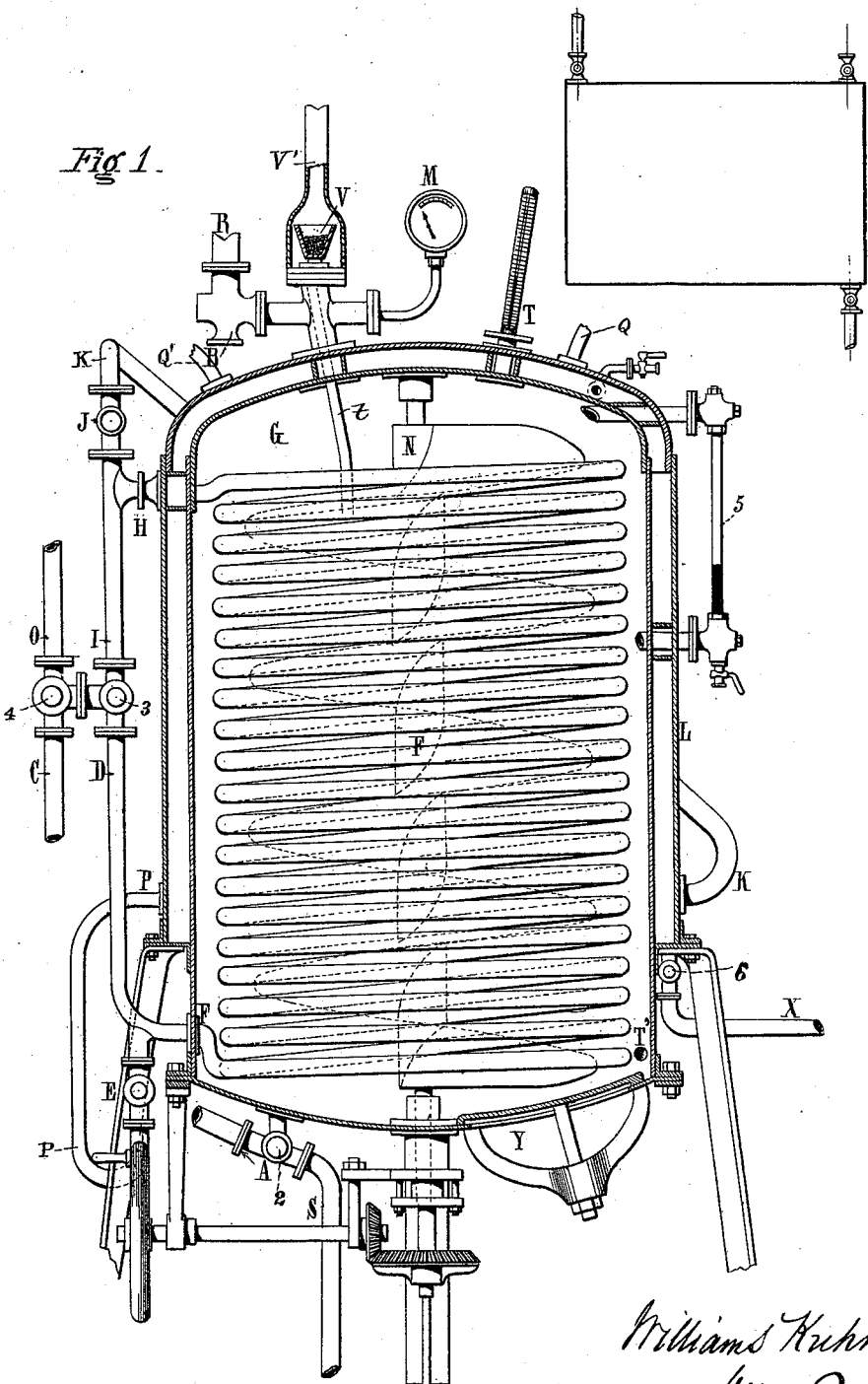

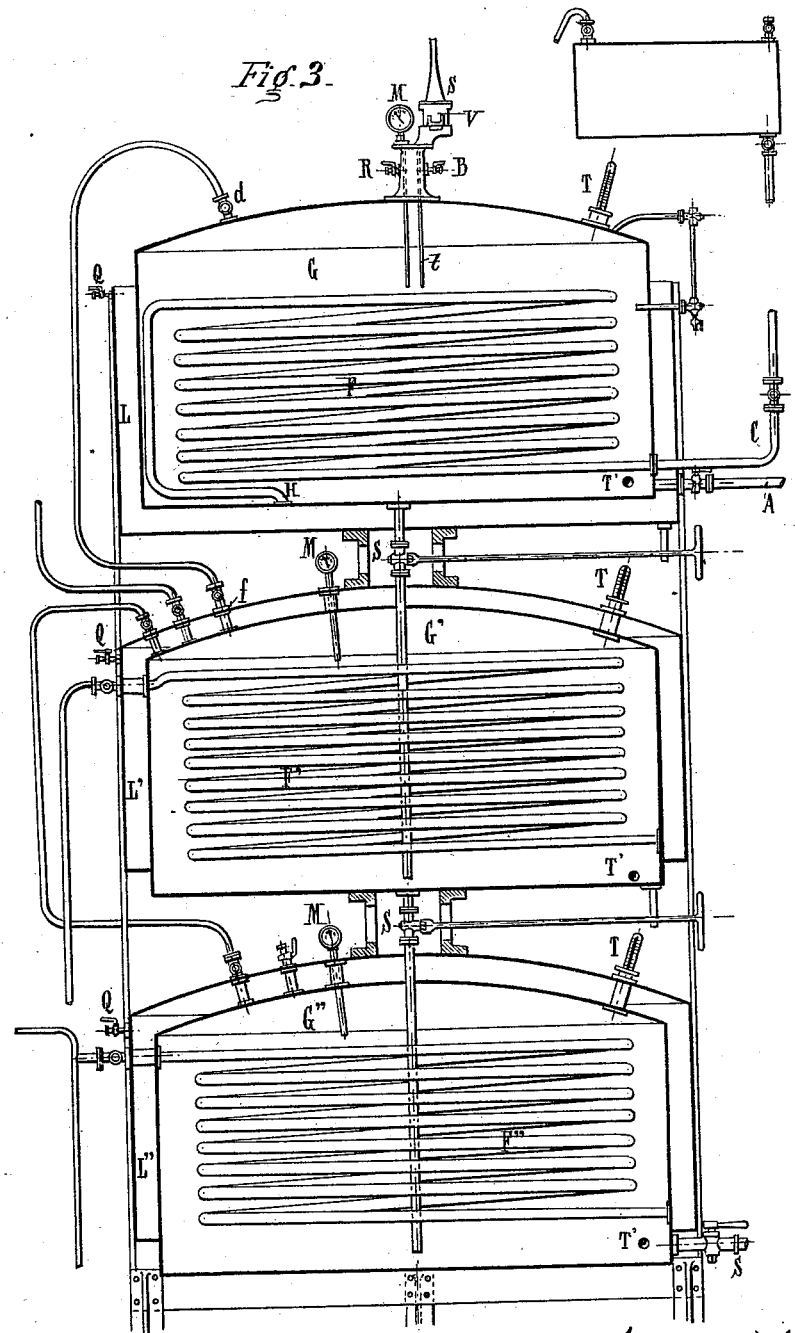

(No Model.) 4 Sheets—Sheet 4.
W. KUHN.
PROCESS OF PASTEURIZATION OF BEER.
No. 418,872. Patented Jan. 7, 1890.
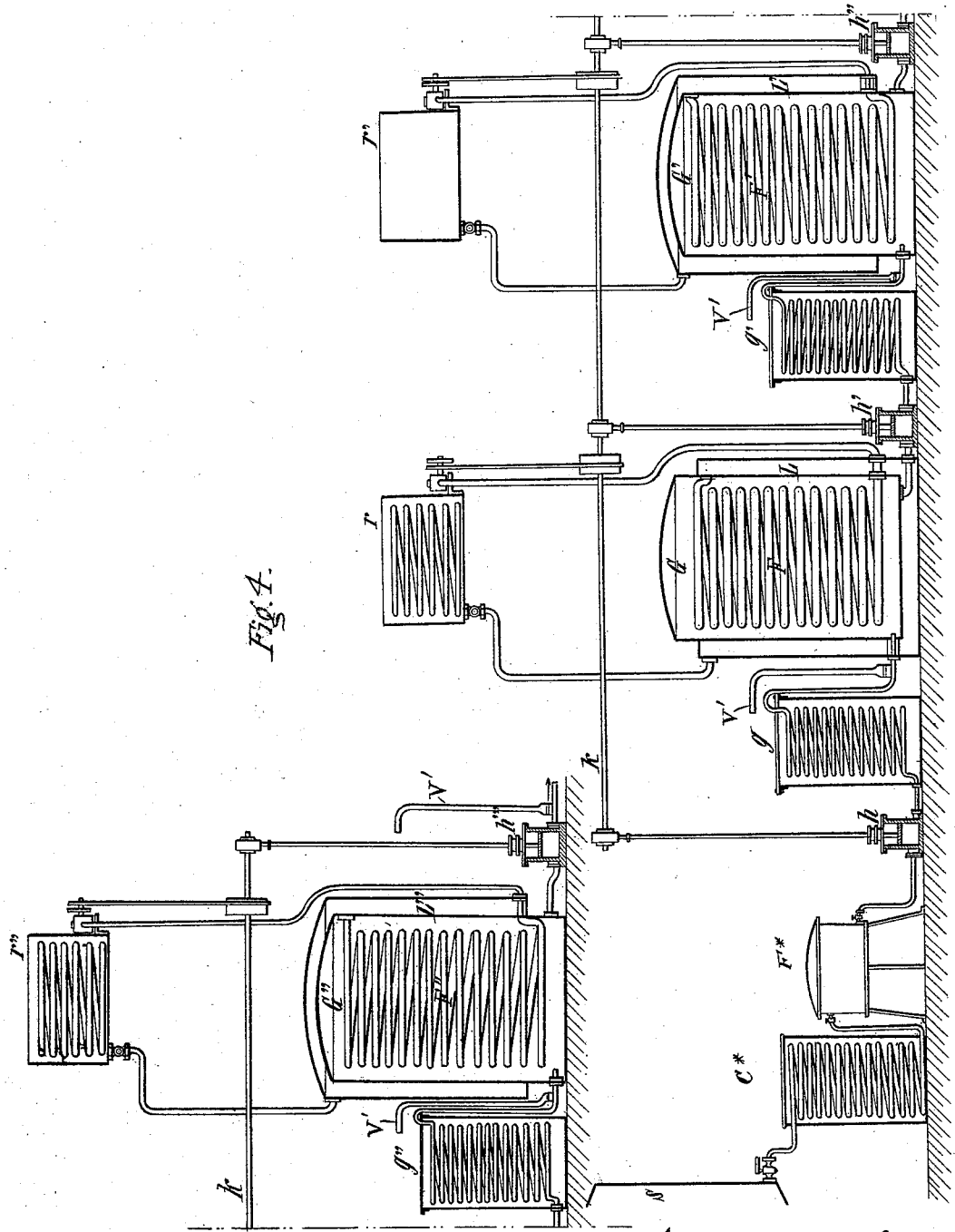

UNITED STATES PATENT OFFICE.

WILLIAMS KUHN, OF CLERMONT-FERRAND, FRANCE.

PROCESS OF PASTEURIZATION OF BEER.

SPECIFICATION forming part of Letters Patent No. 418,872, dated January 7, 1890.

Application filed November 16, 1888. Serial No. 291,049. (No model.) Patented in France August 17, 1888, No. 192,459.

*To all whom it may concern:*

Be it known that I, WILLIAMS KUHN, a citizen of the Republic of France, and a resident of Clermont-Ferrand, in the said Republic, have invented certain new and useful Improvements in the Pasteurization of Beer, (for which a brevet d'invention, dated August 17, 1888, No. 192,459, has been obtained in France,) of which the following specification is a full, clear, and exact description.

This invention relates to the pasteurization of beer previously made sparkling or carrying a head, and cooled and filtered, in bulk or large volumes, in close vessels, without loss of gas, in such a way as to avoid the decomposition of the unstable organic carbonates.

It involves the use of one or more heating and cooling vessels with extended surfaces for the transfer of heat to and from the beer, and thus permitting the use of a heating medium whose temperature is but little higher than that which the whole bulk of beer is finally to attain, and consequently avoiding the special taste caused by the too high or too prolonged heating of a part of the beer, and permitting the subsequent rapid cooling of the beer in the same vessel or another of said vessels, which cooling is or may be effected or completed by the circulation of the uncongealable liquid of an ice-machine. A rapid cooling—such as obtainable by the use of an uncongealable liquid rather than cold or even iced water—arrests, as I have discovered, any incipient decomposition which the heating may have started, and even causes the recombination of the elements of compounds which have been more or less decomposed, but whose elements, not having been disengaged, yet remain in proximity to each other.

It also further comprises the decantation, by isobarometrical apparatus, of the pasteurized and cooled beer into carefully-sterilized and hermetically-closed casks or kegs for transportation or marketing.

The qualities of beer may be considered in their physiological aspect—that is to say, in respect to taste and fitness for use as a beverage or food liquid—or in their scientific and technical aspect—that is to say, in respect to normal composition, proper proportion of constituents, purity of yeast and must, and, by consequence, limpidity and conservability. The desired physiological qualities can be secured in breweries by the application of methods based on the recent very complete works and studies in the brewing academies of Germany and Austria, and by using pure yeast with these methods the regular manufacture is assured of beer of normal composition, excellent taste, richness and mellowness, and temporary limpidity. I say "temporary limpidity," because, however well and rationally made the beer may be, it is necessarily in its essence an extremely-alterable liquid, and contains in itself the elements, active and passive, of its alteration. Its limpidity cannot therefore be otherwise than of short duration under the ordinary conditions of closure and temperature.

Beer is essentially alterable and transformable. Foreign elements become introduced into its composition, and these elements, themselves organized, continue their work of decomposing organic matters, which they slowly assimilate. To satisfy commercial conditions and preserve the scientific conditions which the beer should fulfill, it is necessary to resort to artificial means for preserving the taste and limpidity. The mode first followed was by chemicals or antiseptic agents; but this has been disused because of the inconveniences which arise from the addition of substances which remain in the beer and are taken with the latter into the system of the drinker without well-founded assurances that they are innocuous. The minds of those desiring to preserve beer were after a little turned toward physical means of keeping beer unaltered, and in this direction great progress has been made. Filtration was a long step toward the solution of the problem, and when—as in the case of bottled beer, for example—filtration can be followed by heating or pasteurization, rationally performed, a perfect result is obtained for this class of trade.

The value of pasteurization is shown by the universal employment which it has been given in the brewing industry. Beers whose good primary quality results from a proper proportion of the elements combined with a good manufacture are insured by the combined operations of filtration and pasteurization of a sufficient conservation for commercial purposes. After having been deprived by filtration of the corpuscles in suspension which might provoke decompositions the beer is finished by heating and made unalterable in the state in which it is at the moment of operation, its constituent elements no longer being able to transform themselves on account of the want of energy in the traces of ferment which have escaped the action of the filter. The beer thus acquires an unalterability which can be regulated by the brewer properly adjusting the degree of heat, while avoiding the production of any peculiar taste, provided the operation is conducted with care. It is this result, already so large as applied to the bottled product throughout the entire world, which it is my main object to multiply a hundredfold by permitting the application of the same principle to a form of transportation much more remunerative and commercial—to wit, the transportation or sale in casks or kegs of any capacity.

My invention, by permitting the export and carriage in casks or kegs of all dimensions, is calculated to change completely the conditions of the commerce in beer, and to extend immensely the basis of the operations of breweries adopting it by rendering transportable, like wine, a liquid whose output in casks or kegs has heretofore been restricted to a relatively small area.

The end which I have sought to accomplish for casks has already been the object of researches for the pasteurization in large volume in reference to transportation and sale of the beer in bottles; but the previous systems contain important gaps, for the result sought is much more complex than it would seem at first, and this because of the complex composition of beer.

The characteristics of my invention which differentiate it from analogous apparatus reside, principally, in the two following points:

First. The liquid charged with gas, being in a close vessel and being permitted only the dilation incident to the elevation of temperature, it follows that only an infinitesimal quantity of carbonic acid can escape from the beer. This is a matter of great delicacy, for carbonic acid exists in beer not only in a state of solution, but also of combination with many organic bodies, with which it forms carbonates, whose presence is necessary to the good quality of the beer. The carbonic acid in solution, if allowed to escape, can be redissolved; but the carbonic acid which has entered into combination with certain bodies only because these were encountered in a nascent state it is often impossible to force again into combination when once disengaged, and the partial decomposition of these carbonates involves a deterioration in the taste and keeping qualities of the beer, which my invention avoids entirely.

Second. The second point which distinguishes my invention from those previously devised is the very extensive distribution of the heating-surfaces whereby the maximum temperature of pasteurization is given in the smallest possible time, and the use for the heating or pasteurizing medium of water at a temperature but little higher than the temperature of pasteurization or final temperature of the beer. This result is obtained by the multiplication to the largest extent possible of the heating-surfaces in contact with the beer by means of coils and jackets or similar contrivances, the whole so constituted, arranged, or combined that the volume of beer to be heated has the largest number of points of contact with the heating-surfaces. This, also, is very important, for it is necessary on the one hand that no part of the beer should be heated above the final temperature of the operation, since otherwise this portion of beer, being overheated, is liable to be decomposed and take on a peculiar taste, (termed "taste of pasteurization,") which it communicates to the whole mass in a manner analogous to that which takes place in cooking milk, and which requires it to be cooked on a water-bath; and, on the other hand, it is necessary that no part of the beer should fail to be brought to the final degree, for in such part there would remain or be apt to remain non-anæsthetized ferments, which might cause turbidity later on. This is avoided by the uniformity of temperature throughout the body of liquid, which is obtained in my invention by means of a screw or other means for imparting motion, which mixes the layers of different density or temperatures, or by means of other special arrangements or instrumentalities, the uniformity of the mixture being determined by means of thermometers placed at the top and bottom.

Another point which distinguishes my invention from others of the same class is the use of the very cold non-congealable liquid from an ice-machine, which I pass through the cooling coils or receptacles immediately after the ordinary cold water, so as to lower the temperature and pressure rapidly to the point where it is ready to be sent out.

At first view the use of the cold liquid may appear onerous; but if it be considered that by thus treating the beer it can be sent out after a month and a half in the vault it will be seen that there is a large economy from the shorter stay in the vault, to say nothing of the considerable reduction of material, vats, and tuns, and the diminution in the vault-room, which is very considerable. It is thus an important item that by my present invention the beer can be sent out younger than heretofore, and, as is known, young beers are often superior in taste, delicacy, and richness to beers which have long stood in tuns, the only reason heretofore for not sending it out in the young state being the fear of turbidity afterward. By my invention the formation of precipitate is prevented and beers can be sent out very young, much more sparkling, with more bouquet, and finer.

The present invention therefore involves pasteurization by means of the instrumentalities herein described or other suitable instrumentalities, followed by rapid cooling in close vessels, with a special view to the preservation and transportation or marketing of beer in casks or kegs.

Pasteurization in close vessels is included in the invention when carried into effect by means of my apparatus or arrangement of instrumentalities herein described, or other apparatus analogous to mine and based on a like operation, or by any suitable appliances; but while the invention thus extends to the use of suitable instrumentalities or apparatus in general it specially covers substantially what is herein described for carrying the invention into effect. The form and disposition of the apparatus and the accessories being capable of variation and adaptation to the needs of each special installation, I reserve the right to make in my apparatus such modification or improvement as I may judge proper, and I include, also, the use of my invention under other forms, the said invention involving the pasteurization of beer in bulk or large volumes in close vessels without loss of gas, followed by rapid cooling in the same or connected receptacles, with a view especially to the transportation or sale of the pasteurized beer in casks, sterilized and hermetically sealed.

In the accompanying drawings, which form part of this specification, four forms of apparatus in accordance with the invention are represented.

Figure 1 is a vertical section of the first form; Fig. 2, a similar view of the second; Fig. 2ª, an end view of several of the vessels represented in Fig. 2 connected with one another; Fig. 3, a vertical section of the third form, and Fig. 4 a similar view of the fourth of said forms.

Referring to Fig. 1, the cylinder G, of copper, provided with convex heads riveted thereto, has its upper part covered with a jacket L, of galvanized iron, and is supported on legs. At the bottom of the vessel G is a man-hole Y, to give access to the interior for repairs, inspection, cleaning, &c. A copper coil F of large pipe wound in closely-set spirals, of diameter nearly equal to that of the vessel G, extends through nearly the whole height of said vessel, so as to distribute the cooling medium to all parts of the vessel G. The lower end of the coil F passes through the wall of the vessel G and is connected with the branched pipes D and P. The upper end passes through the walls of the vessel G and its jacket L, and is connected at H with the pipe I, of which the pipe K is a continuation. The pipes P and K each communicate with the bottom of the jacket L, and are provided with stop-cocks E and J, respectively. The pipes I and D are connected through the two-way cocks 3 and 4 and a short cross-pipe with the pipes O and C, so that the heating or cooling medium for one or other of the pipes O and C can be directed into the pipes I or D, as may be necessary. The pipes A and S are in communication through the two-way cock 2 and a short upright pipe with the lower part of the vessel G, so that the beer can be introduced into said vessel G through the pipe A and drawn off by the pipe S. Inside the vessel G is a screw N, having a bronze shaft and a thread or blades of thin copper, whose lower edge may graze the bottom of the vessel. The shaft passes through a stuffing-box and is supported in a step outside, and is driven by bevel-gears or otherwise. The safety-valve V has its pressure-pipe $t$ extended into the vessel below the intended level of the liquid therein, so that escape of gas is prevented. The valve V is suitably loaded, as shown, by shot placed in a cup on the valve, and is placed in a chamber at the end of the pipe V' for conducting liquid which may pass the valve into a suitable receptacle. A straight thermometer T, placed at the top, and a bent thermometer T', placed at the bottom, of the vessel G, serve to indicate the temperature inside the same at these points. The thermometers are protected against the outside influences by suitable means. At B is a blow-off, at M a pressure-gage, at R a pipe for introducing gas—such as air or carbonic acid—under pressure into the vessel G, at 5 a level-indicator, at X a draw-off pipe, provided with a cock 6, for emptying the jacket L, and at Q Q' outlets for the heating or cooling medium.

The operation is as follows: The beer (expelled from the tuns or receptacles containing the beer to be treated) by a pressure of suitable gas—such as pure air or carbonic acid—passes through a freezing-coil to precipitate the matters susceptible of coagulation by cold and then through a cellulose filter. Being thus cold, full of gas, and limpid, it is introduced into the vessel G through the pipe A until it fills the same, during which time the air or carbonic acid already in the vessel escapes by the blow-off B. When the apparatus is full, the blow-off B and the stop-cock 2 are closed. The cocks E and 6 being also closed, warm water at a temperature slightly above that at which pasteurization is to be effected is introduced by the pipe C, cocks 4 and 3, and pipe D into the lower part of the coil F, where it heats the lower layer of beer, which is constantly elevated by the screw N. The warm water ascends through the coil F, passes into and through the pipe K (whose cock J is open) into the lower part of the jacket L, which it fills, and after circulating around the vessel G flows out by the diametrically-opposite outlet-pipe Q'.

By means of the pressure-gage M and thermometers T T' it is possible to observe all phases of the operation. Any difference in temperature between the upper and lower parts of the liquid can be observed by comparison of the two thermometers, and by the aid of the screw N the different parts can be mixed together and a mean temperature secured. When a sufficient mean temperature has been secured, the inflow of warm water is stopped, the jacket L is emptied by the pipe X, and cold liquid is introduced by the pipe O. The cocks 4 and 3 being reversed, the cocks J and 6 closed, and the cock E opened, the cold water passes through the pipes I H into the top of the coil F, through which it passes from top to bottom, or in the opposite direction to the warm water. Arrived at the bottom, the cold water passes by the pipe P into the jacket L, which it fills and from which it escapes by the diametrically-opposite outlet Q after cooling the outside of the vessel G.

When the temperature and pressure have been sufficiently lowered, air or carbonic acid under pressure is introduced by the pipe R, and the cock 2 being changed the beer is discharged through freezing-coils, and by means of an isobarometrical apparatus of Richard, or apparatus having an inlet-pipe for conveying the liquid into the keg or cask and a discharge-pipe for conveying the gas or air in the keg into the vessel from which the liquid is withdrawn, is transferred without contact with the atmosphere to shipping kegs or casks which have been carefully sterilized and hermetically closed.

Any suitable means may be used for sterilization and hermetic closure.

In Fig. 2 a horizontal apparatus is represented. It is composed of a copper cylinder G, inclosed in an iron-jacket cylinder L. The ends of the cylinders can be removed for cleaning and access to the inside of the apparatus. By undoing the connections at C', a, and H the coil F can be taken out and cleaned. This coil of large pipe, with coils of nearly the diameter of the vessel G, has said coils set closer together toward the end Z of the apparatus, so that the farther the liquid is from the inlet the more extended is the heating-surface in a given cubical space. By this arrangement the elevation in temperature is made uniform throughout the length of the vessel G. The apparatus is provided with a pressure-gage M, safety-valve V, with pressure-pipe extended below the level of the liquid in the vessel G, and a pipe V' for carrying off the liquid which may pass the valve, thermometers T T' at each end, blow-off B, inlet R for a suitable gas—such as compressed air or carbonic acid under pressure—and other accessories, which are lettered the same as in Fig. 1.

The beer, freezing cold, sparkling and filtered, is forced into the vessel G through the pipe and cock 2 until it fills said vessel to the top, whereupon the cock 2 is closed, and warm water is introduced at C' into the coil F, whose heating action, owing to the disposition of the coil F, is uniform throughout its length. After passing through the coil the water enters the envelope or jacket at H, flows around and along the vessel G, and escapes at Q. When the beer has attained the desired degree of heat, and it is found that the pressure and temperature are uniform, access of warm water is shut off and cold water and the uncongealable liquid are passed in succession through the coil F and jacket L, the jacket having been first emptied through the pipe X. The cooling is effected by circulation through the same course that the heating-liquid followed, and when the beer has been brought to its primitive temperature and pressure pure air or carbonic acid is admitted under pressure into the vessel G through the pipe R, and forces the beer by an isobarometrical apparatus into sterilized and hermetically-closed kegs or casks.

In Fig. 2$^a$ three apparatus L L' L''—such as represented in Fig. 2—are shown connected together, so that the beer, having been heated to the desired temperature in apparatus L, can be discharged by the pressure of air or carbonic acid through the pipe S' into the apparatus L' and therein cooled by ordinary cold water to or about the temperature of such water, and thence passed by pipe S$^2$ into the apparatus L'', wherein the uncongealable liquid of an ice-machine is circulated, and whence, having been brought to its primitive condition, it is transferred to the shipping kegs or casks through the pipe S$^3$. In transferring the beer from apparatus L to apparatus L', and from that to apparatus L'', care is taken to prevent the pressure from falling, and for this purpose superior pressure is first applied and the upper parts of the interior vessels in the two apparatus are connected, so that as the beer flows from the one apparatus to the next the compressed air or gas in the latter returns to the former.

Referring to Fig. 3, there are three superposed copper vessels G'' G' G, provided with jackets L'' L' L and coils F'' F' F, respectively, as well as pressure-gages M, thermometers T T', &c., as in the preceding apparatus. The top vessel G being full of beer, the heating-liquid is circulated through the coil F from C to H, fills the jacket L, and passes off by the outlet Q. When the beer has all attained the desired temperature, air or carbonic-acid gas is let in under a pressure superior to that in the vessel G, the upper part of the vessel G' is put in communication with that of the vessel G through the pipe $fd$, and, the cock in pipe S being opened, the beer is transferred to the vessel G', and during its entrance is always subjected to the counter-pressure of the air or gas, which prevents effervesence. The air or gas from the middle vessel G' passes through the pipe $fd$ into the upper vessel G to fill the space left by the outflow of the beer. Ordinary cold water is circulated through the coil F′ and jacket L′ of the middle apparatus, and an uncongealable freezing-liquid through coil F″ and jacket L″ of the bottom apparatus, the beer having been transferred to the vessel G″ under pressure. The beer from the vessel G″ passes, still under pressure and with like precautions, into the kegs or casks for transportation.

The arangement of Fig. 4 is designed to effect a continuous and uninterrupted treatment of the beer while still kept in close vessels and without loss of gas. It is composed of three vessels G G′ G″, (the vessel G″, on account of the small size of the sheet, being shown above instead of in its correct position at the right of the vessel G′,) and each vessel is preceded by a coil $g$ $g'$ $g''$, respectively, through which the beer passes. Between the tun $s$ and the first coil $g$ is a pump $h$, and pumps $h'$ $h''$, respectively, are placed between each vessel G G′ and the succeeding coil $g'$ $g''$, and there is also a pump $h'''$ between the vessel G″ and the shipping-kegs. The same shaft $k$ operates the four pumps. The pump $h$ withdraws the beer from the tun $s$ and forces it through the coil $g$, which is immersed in water heated to the desired temperature of pasteurization. The beer is thus raised in temperature and is forced into the close vessel G, whence the pasteurization is completed by the circulation of warm water in the coil F and jacket L. From the vessel G the beer is withdrawn by the pump $h'$ and forced through the coil $g'$, immersed in cold water, and thence into the vessel G′, wherein it is further cooled, while still under pressure, by a circulation of cold water through the coil F′ and jacket L′. From the vessel G′ the partially-cooled beer is forced by the pump $h''$ through the coil $g''$ and vessel G″, wherein, by the uncongealable liquid of an ice-machine, it is reduced to its normal temperature and pressure, and thence transferred to the shipping kegs or casks by the fourth pump $h'''$. As shown, there are three reservoirs $r$ $r'$ $r''$. In the reservoir $r$ water is heated to the pasteurization-temperature by a steam-coil. The reservoir $r'$ is for ordinary cold water, and in the reservoir $r''$ an uncongealable liquid is cooled by a coil forming part of the circulation of an ice-machine. Before it enters the coil $g$ the beer from the tun $s$ passes through freezing-coil C* and a filter F*. In advance of each pump is a safety-valve and pipe V′, for conducting any liquid which may pass the valve into a suitable receptacle. Thus any difference in the delivery of the different pumps may be equalized. With this apparatus the beer flows continuously, yet is kept always under pressure in close vessels, because the valve of one pump is always closed when that of the preceding or the following one is open, and the escape of carbonic acid is prevented.

In all the arrangements the beer which escapes past the safety valve or valves is or may be conducted by the pipe or pipes V′ to a small hermetically-closed reservoir, whence it can be returned to the apparatus by means of a superior pressure of carbonic acid without any exposure to the outside atmosphere.

I may not only treat beer in the manner and by the means described, but also wine, milk, and all other liquids which are fermentable and carry a head, as also mineral waters in bulk.

In referring to the treatment as being in close vessels it will, of course, be understood that I do not limit myself to the use of more vessels than one, but that one or more vessels may be used.

The number of vessels in which the beer or other liquid is heated or cooled or otherwise treated (whether in a single vessel or in a larger number) is immaterial.

I claim as my invention or discovery—

1. The improvement in preparing beer and other fermentable and gas-charged liquids, including mineral waters, for preservation by pasteurization and cooling in bulk, the said improvement consisting in the introducing of the liquid into a close vessel or vessels, the heating of said liquid to the temperature of pasteurization by a medium of slightly-higher temperature distributed to all parts of said vessels and communicating its temperature evenly to all parts of the liquid, the keeping of the liquid treated under pressure equal to or in excess of that necessary to prevent loss of gas, and the rapid cooling of the heated liquid still in close vessels, substantially as described.

2. The improvement in preparing beer and other fermentable or gas-containing liquids for preservation by filling a close vessel or vessels substantially full of the liquid, heating the same to the temperature of pasteurization by a medium of slightly-higher temperature distributed to all parts of the said close vessels and communicating its temperature evenly to all parts of the liquid, permitting the requisite dilation through the escape of the liquid under a pressure equal to or above that necessary to prevent loss of gas, and rapidly cooling the liquid still in close vessels, substantially as described.

3. The improvement in preparing beer and other fermentable gas-containing liquids for preservation by introducing the liquid into a close vessel or vessels, heating the same to the temperature of pasteurization by a medium of slightly-greater temperature, insuring even heating of the liquid by imparting motion thereto in said close vessels and over the surfaces heated, as aforesaid, slightly above the temperature of pasteurization, and afterward rapidly cooling the liquid still in close vessels, substantially as described.

4. The improvement in preparing beer and other fermentable or gas-containing liquids for preservation by cooling the beer or other liquid to a very low temperature, then filtering the same, then introducing it into a close vessel or vessels, raising it therein evenly to the temperature of pasteurization by a medium of slightly-higher temperature distributed to all parts of the vessels, keeping it under the pressure necessary to prevent loss of gas, and rapidly cooling the heated liquid, substantially as described.

5. The improvement in preparing beer and other fermentable or gas-containing liquids for preservation and transportation or marketing by introducing the beer or other liquid into a close vessel or vessels, heating it therein evenly or uniformly to the temperature of pasteurization by a well-distributed medium of slightly-higher temperature, so as to avoid imparting the peculiar taste given by overheating parts of the liquid, keeping the liquid under pressure necessary to prevent loss of gas, rapidly cooling the same still in close vessels, and transferring it without access to the outside air into sterilized and hermetically-closed casks or kegs, substantially as described.

6. The improvement in preparing beer and other fermentable or gas-containing liquids for transportation or marketing by cooling the beer or other liquid to a very low temperature, filtering it, then introducing it cold and without intermediate exposure into a close vessel or vessels, raising the liquid uniformly to the temperature of pasteurization by a medium of slightly-higher temperature distributed through the liquid, then rapidly cooling, and finally transferring at a low temperature without exposure to the outside air into sterilized and hermetically-closed casks or kegs, substantially as described.

In testimony whereof I have signed this specification in the presence of two subscribing witnesses.

WILLIAMS KUHN.

Witnesses:
R. TARJO,
J. C. MENDIG.